(12) United States Patent
Biegun

(10) Patent No.: US 8,998,340 B1
(45) Date of Patent: Apr. 7, 2015

(54) PASSENGER RESTRAINT FOR AMUSEMENT PARK RIDE

(71) Applicant: Jeffery L. Biegun, Jupiter, FL (US)

(72) Inventor: Jeffery L. Biegun, Jupiter, FL (US)

( * ) Notice: Subject to any disclaimer, the term of this patent is extended or adjusted under 35 U.S.C. 154(b) by 0 days.

(21) Appl. No.: 14/083,276

(22) Filed: Nov. 18, 2013

(51) Int. Cl.
*B60R 21/00* (2006.01)
*B60R 21/09* (2006.01)
*B60R 22/00* (2006.01)
*B60R 21/02* (2006.01)

(52) U.S. Cl.
CPC ..................... *B60R 21/02* (2013.01)

(58) Field of Classification Search
USPC .......................................... 297/464, 468, 487
See application file for complete search history.

(56) References Cited

U.S. PATENT DOCUMENTS

| 3,955,056 | A | * | 5/1976 | Lindblad | 297/468 X |
| 4,345,780 | A | * | 8/1982 | Moriya et al. | 297/467 X |
| 4,555,831 | A | * | 12/1985 | Otzen et al. | 297/468 X |
| 5,044,664 | A | * | 9/1991 | Mogi | 297/468 X |
| 5,129,478 | A | * | 7/1992 | Suenaga et al. | 297/487 X |
| 5,286,091 | A | * | 2/1994 | Busch | 297/487 X |
| 7,677,671 | B2 | * | 3/2010 | Steininger et al. | 297/487 |
| 8,449,038 | B2 | * | 5/2013 | Flanigan | 297/468 |
| 8,590,935 | B1 | * | 11/2013 | Leedy | 297/468 X |
| 2012/0068521 | A1 | * | 3/2012 | Roodenburg et al. | 297/487 |

* cited by examiner

Primary Examiner — Rodney B White
(74) Attorney, Agent, or Firm — Simpson & Simpson, PLLC

(57) ABSTRACT

A passenger restraint including a buckle, a locking arm, a power supply, a bracket, a mount, and a rod. The buckle has a button capable of being depressed. The locking arm has first and second extensions extending outwardly therefrom, and first and second prongs extending downwardly from the first and second extensions, respectively. The buckle includes an opening arranged to receive the first and second prongs. Furthermore, there is a bracket secured to the locking arm, a mount having first and second mount sides and first and second mount side fastening means. The power supply is secured to the mount and the bracket is secured to and pivotable about the mount via first and second mount side fastening means. The locking arm is in an open position but when an electrical signal is applied the locking arm extends downwardly into the opening of the buckle into a closed position.

11 Claims, 7 Drawing Sheets

PASSENGER RESTRAINT FOR AMUSEMENT PARK RIDE

FIELD OF THE INVENTION

The invention broadly relates to a passenger restraint for an amusement park ride, and in particular, to a passenger restraint having a buckle and a locking arm, such that when an electrical signal is applied, the locking arm shifts from an open position to a closed position.

BACKGROUND OF THE INVENTION

Passenger restraints for amusement park rides are well known. Amusement park rides can include a variety of different ride types, such as thrill rides, roller coasters, train rides, water rides, Ferris wheels, transport rides, and the like. Depending on the ride, the majority of amusement park rides have some form of passenger restraint to prevent riders from falling from the ride or exiting the ride at an inappropriate time. Amusement park rides are subject to state and local governmental codes, requirements, and safety inspections, and must pass rigorous inspections by insurance companies.

Despite safety measures, accidents relating to amusement park rides can, and do, occur. Ride accidents can be caused by riders themselves, ride operators not following safety directions properly, or by mechanical failures related to the ride or passenger restraints. Additionally, a major cause of deaths and injuries on amusement park rides is preventable error. This would include such things as the lack of routine maintenance and the disregard of safety rules by both operators and riders. In particular, on rides having lap restraints, riders have been known to unbuckle the restraint while the ride is in motion, posing a serious risk of injury and potentially death, not only to that particular rider but to other riders as well. Thus, there is a long felt need for a passenger restraint for an amusement park ride that complies with current safety standards and prevents riders from being able to undo the restraint and exit the ride while the ride is in motion.

BRIEF SUMMARY OF THE INVENTION

The present invention broadly includes a buckle, a locking arm, a power supply, a bracket, a mount, and a rod. The buckle has a top surface, front surface and a button integral with the front surface, where the button is capable of being depressed. The locking arm has first and second extensions, each extension extending outwardly therefrom, and first and second prongs, each prong extending downwardly from the first and second extensions, respectively. The top surface of the buckle includes an opening operatively arranged to receive the first and second prongs. The bracket is secured to the locking arm. The mount has first and second mount sides and first and second mount side fastening means. The power supply is secured to the mount and the bracket is secured to and pivotable about the mount via first and second mount side fastening means. The bracket further includes first and second rod fastening means and the rod is secured to the bracket via first and second rod fastening means. Additionally, the rod is secured to the power supply and the locking arm is in an open position until an electrical signal from the power supply is applied. When an electrical signal is applied, the rod is operatively arranged to extend outwardly from the power supply, such that when the rod extends outwardly, the bracket pivots about the first and second mount side fastening means, forcing the locking arm downwardly into the opening of the buckle, and thus, into a closed position.

In one embodiment, the power supply is a solenoid, and preferably, the solenoid is 12 volts. However, it should be appreciated that the power supply can be any suitable type of power supply of any voltage known in the art.

In another embodiment, the passenger restraint further includes a belt and a tongue, where the tongue is secured to the belt. The buckle further includes a spring secured to the button, where the button has a first position and a second position, such that in a resting state the button is in a first position. When the button is depressed, it forms a second position and when the button is released the spring returns the button to the first position. The front surface of the buckle further includes an aperture and the aperture is capable of receiving the tongue. When the locking arm is in a closed position, the button is incapable of being depressed and the tongue is incapable of being removed from the aperture.

In yet another embodiment, the passenger restraint further includes a signaling source and the buckle further includes at least one wire. When the tongue is inserted into the aperture, the tongue makes contact with the at least one wire, where the at least one wire is connected to the signaling source and the signaling source is operatively arranged to change state when the tongue is inserted into the aperture. The signaling source has a first indicator when the tongue is inserted and a second indicator when the tongue is removed, and preferably, the first indicator is a green light and the second indicator is a red light.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. It also should be appreciated that figure proportions and angles are not always to scale in order to clearly portray the attributes of the present invention.

While the present invention is described with respect to what is presently considered to be the preferred aspects, it is to be understood that the invention as claimed is not limited to the disclosed aspects. The present invention is intended to cover various modifications and equivalent arrangements included within the spirit and scope of the appended claims.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
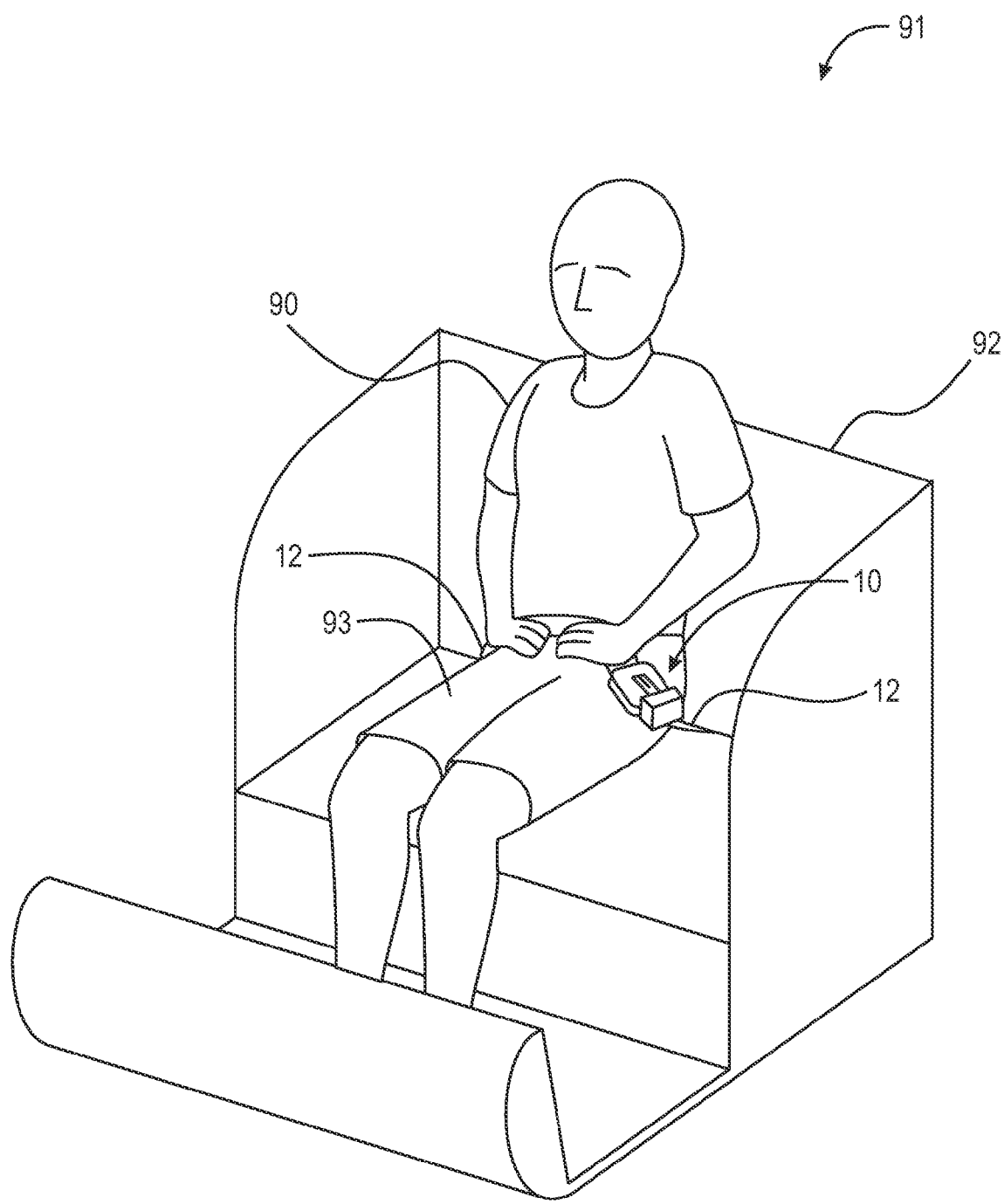
FIG. 1 is a perspective view of a passenger restraint for an amusement park ride, shown with a rider seated in the amusement park ride and secured via the passenger restraint.

Adverting now to the figures, FIG. 1 is a perspective view of passenger restraint 10 of the present invention for amusement park ride 91, shown with rider 90 seated on bench 92 of amusement park ride 91 and secured via passenger restraint 10. Passenger restraint 10 is secured across lap 93 of rider 90.

Figure 2:
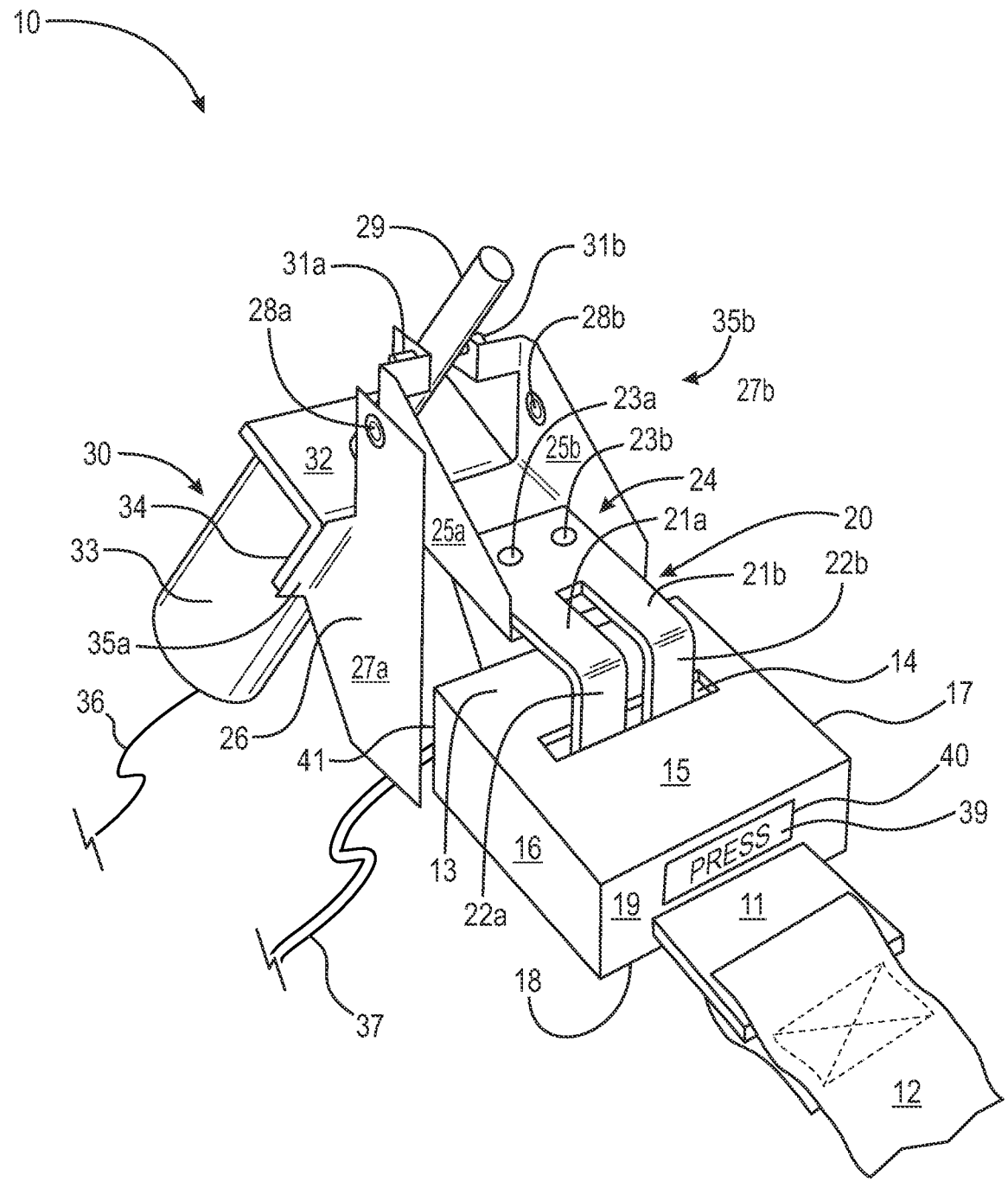
FIG. 2 is a front perspective view of the passenger restraint of FIG. 1.

FIG. 2 is a front perspective view of passenger restraint 10.

Figure 3A:
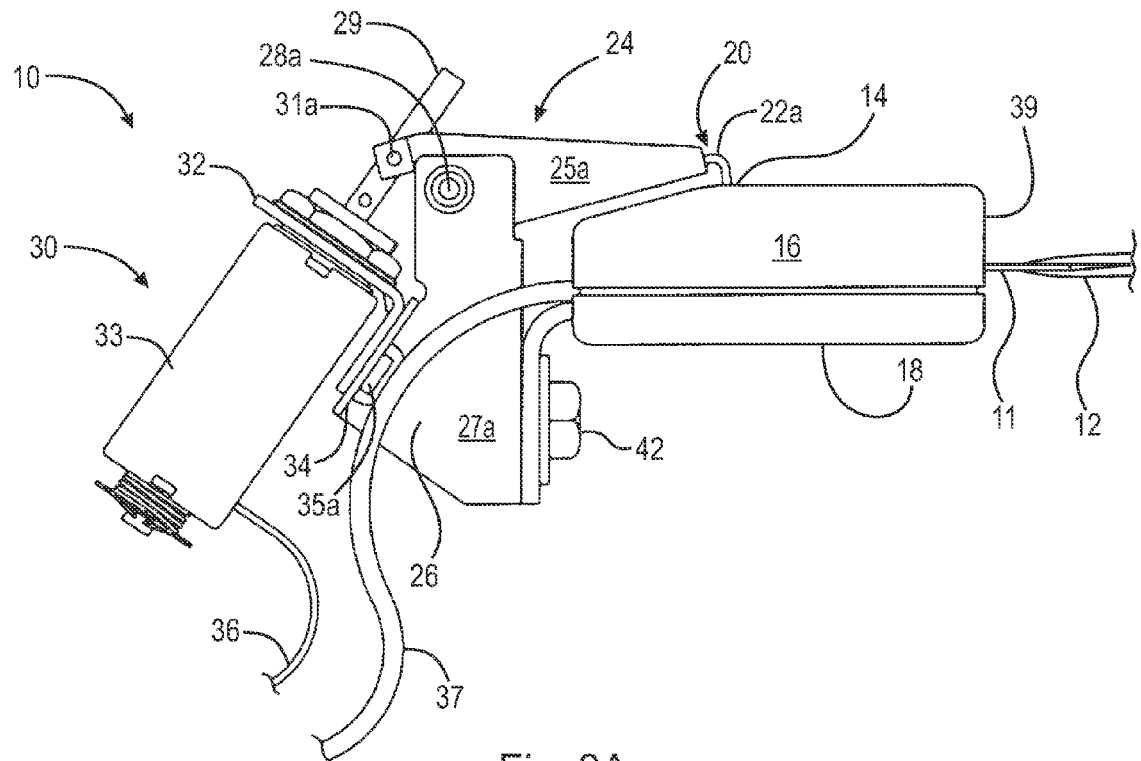
FIG. 3a is a left side elevational view of the passenger restraint of FIG. 2, shown in a closed position.
Figure 3B:
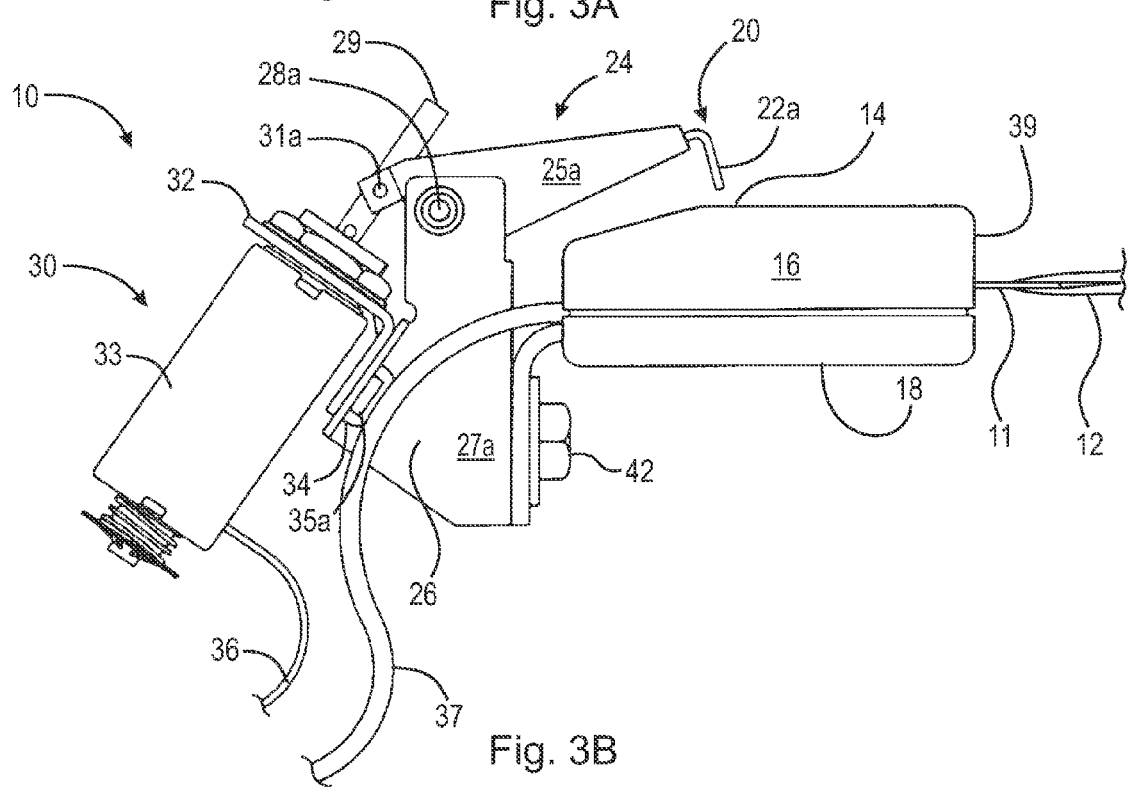
FIG. 3b is a left side elevational view of the passenger restraint of FIG. 2, shown in an open position.

FIG. 3a is a left side elevational view of passenger restraint 10, shown in a closed position. Similarly, FIG. 3b is a left side elevational view of passenger restraint 10, but shown in an open position.

Figure 4A:
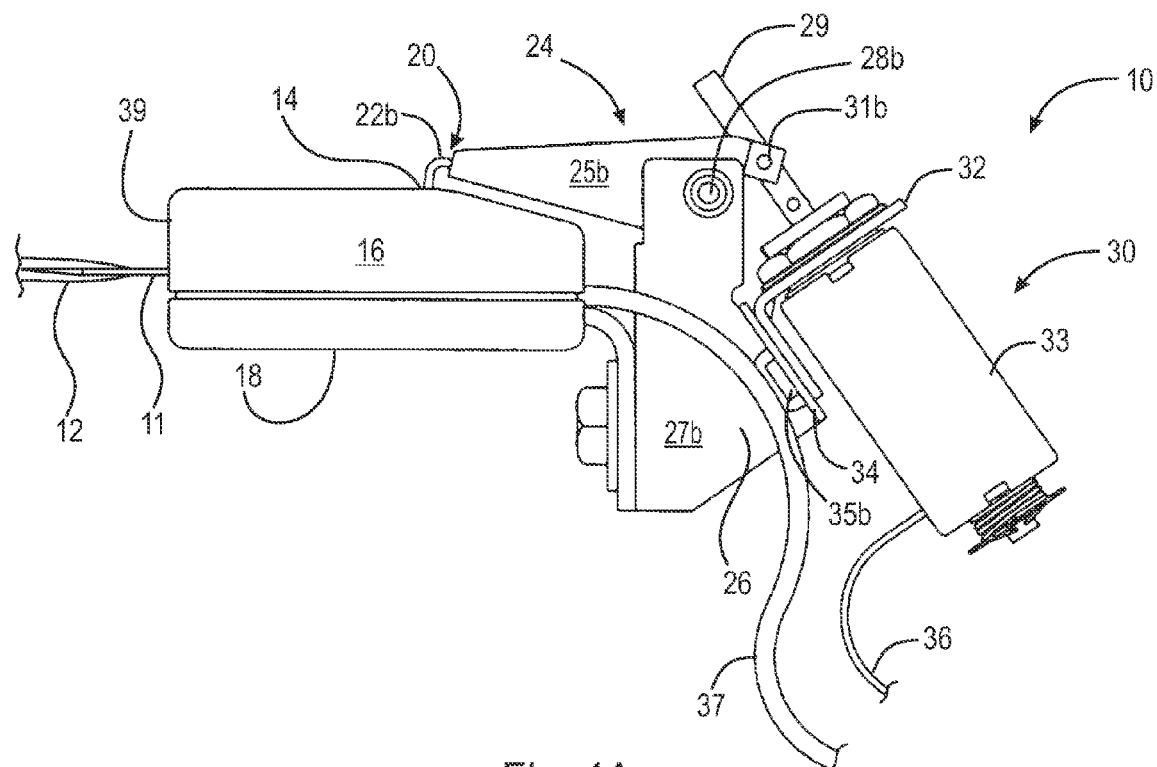
FIG. 4a is a right side elevational view of the passenger restraint of FIG. 2, shown in a closed position.
Figure 4B:
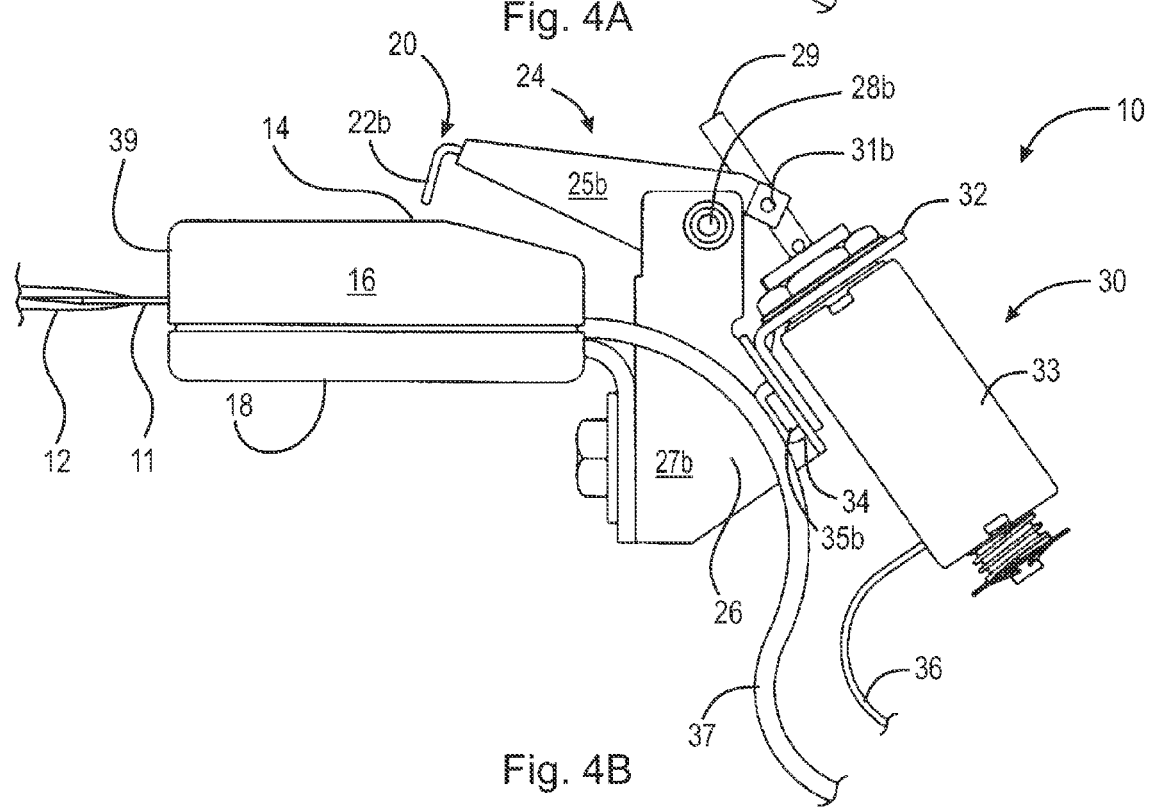
FIG. 4b a right side elevational view of the passenger restraint of FIG. 2, shown in an open position.

FIG. 4a is a right side elevational view of passenger restraint 10, shown in a closed position. Similarly, FIG. 4b a right side elevational view of passenger restraint 10, but shown in an open position.

Figure 5:
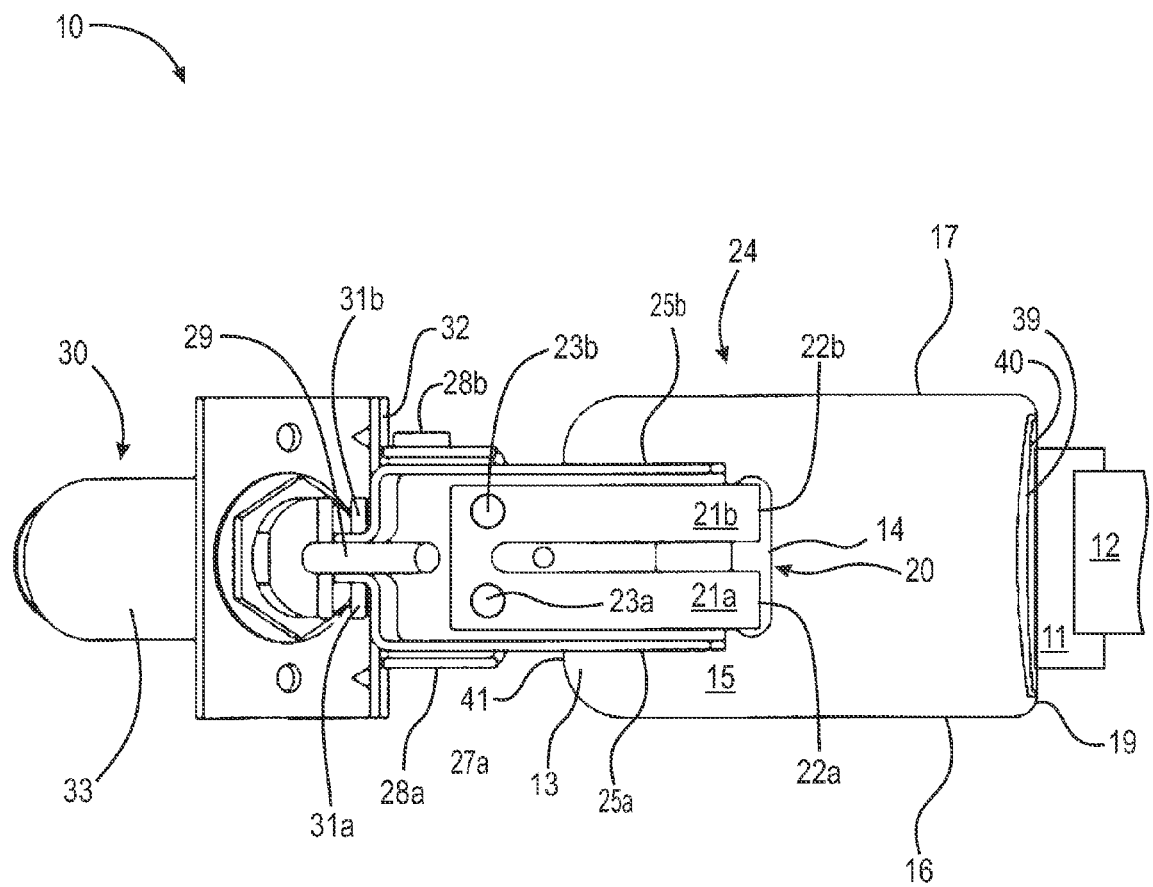
FIG. 5 is a top plan view of the passenger restraint of FIG. 2.

FIG. 5 is a top plan view of passenger restraint 10.

Figure 6:
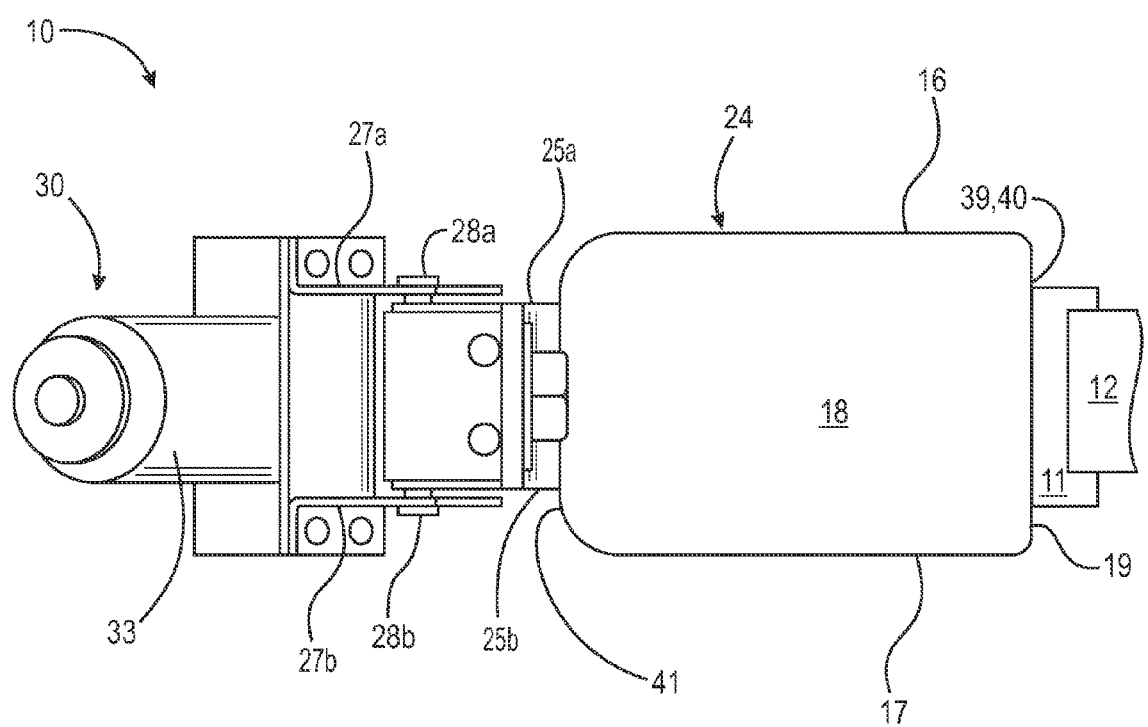
FIG. 6 is a bottom plan view of the passenger restraint of FIG. 2.

FIG. 6 is a bottom plan view of passenger restraint 10.

Figure 7:
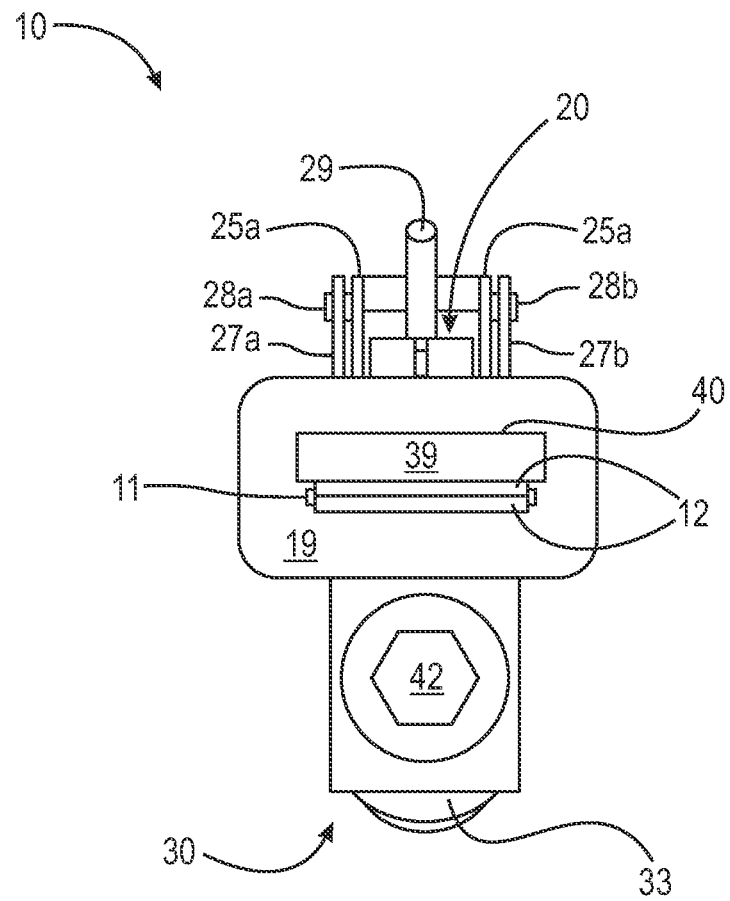
FIG. 7 is a front elevational view of the passenger restraint of FIG. 2.

FIG. 7 is a front elevational view of passenger restraint 10.

The present invention passenger restraint 10 broadly includes buckle 13, locking arm 20, power supply 33, bracket 24, mount 26, and rod 29. Buckle 13 has top surface 15, front surface 19, left side surface 16, right side surface 17, bottom surface 18, and rear surface 41. Buckle 13 further includes button 39 integral with front surface 19, such that button 19 is capable of being depressed. Locking arm 20 has first and second extensions 21a, 21b, each extension 21a, 21b extending outwardly from locking arm 20. Locking arm 20 also has first and second prongs 22a, 22b, each prong 22a, 22b extending downwardly from first and second extensions 21a, 21b, respectively. Top surface 15 of buckle 13 includes opening 14 operatively arranged to receive first and second prongs 22a, 22b. Bracket 24 is secured to locking arm 20. Mount 26 has first and second mount sides 27a, 27b and first and second mount side fastening means 28a, 28b. Power supply 33, which includes at least one wire 36, is secured to mount 26 and bracket 24 is secured to and pivotable about mount 26 via first and second mount side fastening means 27a, 27b. Bracket 24 further includes first and second rod fastening means 31a, 31b and rod 29 is secured to bracket 24 via first and second rod fastening means 31a, 31b. Additionally, rod 29 is secured to and mounted on power supply 33 via support 32, which includes back plate 34. Mount 26 is secured to power supply 33 via back plate 34 by first and second back plate fastening means 35a, 35b. Rod 29, power supply 33, and support 32 form power supply assembly 30. When in a resting state, locking arm 20 is in an open position until an electrical signal from power supply 33 is applied. When an electrical signal is applied, rod 29 is operatively arranged to extend outwardly from power supply 33, such that when rod 29 extends outwardly, bracket 24 pivots about first and second mount side fastening means 28a, 28b, forcing locking arm 20 downwardly into opening 14 of buckle 13, and thus, into a closed position. Locking arm 20 is secured to bracket 24 via first and second locking arm fastening means 23a, 23b. First mount side 27a is secured to first bracket side 25a via first mount side fastening means 28a. Similarly, second mount side 27b is secured to second bracket side 25b via second mount side fastening means 28b. Mounting plate 43 secures buckle 13 to mount 26 via fastening means 42.

In one embodiment, the power supply 33 is a solenoid, and preferably, the solenoid is 12 volts. However, it should be appreciated that the power supply can be any suitable type of power supply of any voltage known in the art.

In another embodiment, passenger restraint 10 further includes belt 12 and tongue 11, where tongue 11 is secured to belt 12. Buckle 13 further includes a spring (not shown in the figures) within buckle 13 secured to button 39. Button 39 has a first position and a second position, such that in a resting state the button is in a first position. When the button is depressed, it forms a second position and when the button is released the spring returns the button to the first position. Front surface 19 of buckle 13 further includes aperture 40 and aperture 40 is capable of receiving tongue 11. When locking arm 20 is in a closed position, button 39 is incapable of being depressed and tongue 11 is incapable of being removed from aperture 40.

In yet another embodiment, passenger restraint 10 further includes a signaling source (not shown in the figures) and buckle 13 further includes at least one wire 37. When tongue 11 is inserted into aperture 40, tongue 11 makes contact with at least one wire 37, where the at least one wire 37 is connected to the signaling source and the signaling source is operatively arranged to change state when tongue 11 is inserted into aperture 40. The signaling source has a first indicator (not shown in the figures) when the tongue is inserted and a second indicator (not shown in the figures) when the tongue is removed. Preferably, the first indicator is a green light and the second indicator is a red light.

It should be appreciated that, any of the fastening means of the passenger restraint can be any suitable fastening means known in the art, such as but not limited to, screws, bolts, welds, etc.

The present invention also includes a method, the method having the following steps: inserting a tongue into an aperture of a buckle; applying an electrical signal to the power supply, which extends the rod; and pivoting the locking arm from an open position to a closed position. Additionally, after the tongue is inserted into the aperture of the buckle, signaling that the tongue is inserted into the buckle via a signaling source.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. A passenger restraint, comprising:
    a buckle, the buckle having a top surface, front surface and a button integral with the front surface, wherein the button is capable of being depressed;
    a locking arm, the locking arm having first and second extensions, each extension extending outwardly therefrom, and first and second prongs, each prong extending downwardly from the first and second extensions, respectively, wherein the top surface of the buckle includes an opening operatively arranged to receive the first and second prongs;

a power supply;

a bracket, wherein the bracket is secured to the locking arm;

a mount, the mount having first and second mount sides and first and second mount side fastening means, wherein the power supply is secured to the mount and the bracket is secured to and pivotable about the mount via first and second mount side fastening means;

a rod, wherein the bracket further includes first and second rod fastening means and the rod is secured to the bracket via first and second rod fastening means, wherein the rod is secured to the power supply and the locking arm is in an open position until an electrical signal from the power supply is applied, such that when an electrical signal is applied, the rod is operatively arranged to extend outwardly from the power supply, such that when the rod extends outwardly, the bracket pivots about the first and second mount side fastening means, forcing the locking arm downwardly into the opening of the buckle and into a closed position.

2. The passenger restraint of claim 1, wherein the power supply is a solenoid.

3. The passenger restraint of claim 2, wherein the solenoid is 12 volts.

4. The passenger restraint of claim 1, wherein the buckle further comprises a spring secured to the button, wherein the button has a first position and a second position, such that in a resting state the button is in a first position and when the button is depressed, it forms a second position, wherein when the button is released the spring returns the button to the first position.

5. The passenger restraint of claim 4, wherein when the locking arm is in a closed position, the button is incapable of being depressed.

6. The passenger restraint of claim 1, further comprising a belt and a tongue, wherein the tongue is secured to the belt.

7. The passenger restraint of claim 6, wherein the buckle further comprises a spring secured to the button, wherein the button has a first position and a second position, such that in a resting state the button is in a first position and when the button is depressed, it forms a second position, wherein when the button is released the spring returns the button to the first position.

8. The passenger restraint of claim 7, wherein the front surface of the buckle further comprises an aperture and the aperture is capable of receiving the tongue, wherein when the locking arm is in a closed position, the button is incapable of being depressed and the tongue is incapable of being removed from the aperture.

9. The passenger restraint of claim 8, further comprising a signaling source and the buckle further comprises at least one wire, wherein when the tongue is inserted into the aperture, the tongue makes contact with the at least one wire, wherein the at least one wire is connected to the signaling source and the signaling source is operatively arranged to change state when the tongue is inserted into the aperture.

10. The passenger restraint of claim 9, wherein the signaling source has a first indicator when the tongue is inserted and a second indicator when the tongue is removed.

11. The passenger restraint of claim 10, wherein the first indicator is a green light and the second indicator is a red light.

\* \* \* \* \*